(12) United States Patent
Shea

(10) Patent No.: US 9,970,638 B2
(45) Date of Patent: May 15, 2018

(54) CIRCULAR AQUARIUM LAMP

(71) Applicant: GUANGZHOU ZETLIGHT ELECTRONIC COMPANY, Guangzhou (CN)

(72) Inventor: HoYan Shea, Hong Kong (HK)

(*) Notice: Subject to any disclaimer, the term of this patent is extended or adjusted under 35 U.S.C. 154(b) by 173 days.

(21) Appl. No.: 15/173,722

(22) Filed: Jun. 6, 2016

(65) Prior Publication Data

US 2017/0292688 A1   Oct. 12, 2017

(30) Foreign Application Priority Data

Apr. 11, 2016  (CN) .................. 2016 2 0294211 U

(51) Int. Cl.

| | |
|---|---|
| *A01K 63/06* | (2006.01) |
| *F21V 33/00* | (2006.01) |
| *F21V 23/00* | (2015.01) |
| *F21V 29/89* | (2015.01) |
| *F21V 21/108* | (2006.01) |
| *F21V 21/14* | (2006.01) |
| *F21V 31/00* | (2006.01) |
| *F21V 21/088* | (2006.01) |

(Continued)

(52) U.S. Cl.
CPC ............ *F21V 23/003* (2013.01); *A01K 63/06* (2013.01); *F21V 21/088* (2013.01); *F21V 21/108* (2013.01); *F21V 21/14* (2013.01); *F21V 21/30* (2013.01); *F21V 29/67* (2015.01); *F21V 29/89* (2015.01); *F21V 31/005* (2013.01); *F21W 2131/308* (2013.01); *F21Y 2113/13* (2016.08); *F21Y 2115/10* (2016.08)

(58) Field of Classification Search
CPC .... A01K 63/003; A01K 63/06; A01K 63/006; F21V 23/003; F21W 2131/308
USPC .......................................... 119/267, 266, 269
See application file for complete search history.

(56) References Cited

U.S. PATENT DOCUMENTS

| | | | | |
|---|---|---|---|---|
| 6,905,233 | B1 * | 6/2005 | Blumenfeld-Kesler | ................... A01K 63/06 362/368 |
| 8,113,147 | B1 * | 2/2012 | Wang | ..................... A01K 63/06 119/267 |

(Continued)

*Primary Examiner* — Yvonne R Abbott-Lewis
(74) *Attorney, Agent, or Firm* — Wayne & Ken, LLC; Tony Hom

(57) ABSTRACT

The invention discloses a circular aquarium lamp that comprises of a lamp body and a lamp bracket, wherein the bracket is connected with the body through a universal ball head. The body includes an upper and lower shell, an LED lamp panel and a heat-dissipating aluminum. The upper and lower shells are connected by a screw. The LED lamp panel and heat-dissipating aluminum are installed separately in a cavity that is formed between the upper and lower shell. The LED lamp panel is located under the heat-dissipating aluminum with a fan on top. A first rubber ring is set in between the LED lamp panel and a water-proof cover, whereas a second rubber ring is set in between the cover and a glass sheet. A control board is contained inside a circuit board shell which is installed in the lower shell.

The radiator of this circular aquarium lamp has adopted a strong convective heat-dissipating design, thereby increasing greatly the cooling effects. Its fan will be turned on automatically when the temperature is relatively high, improving further the heat-dissipating performance. The lamp is of strong practicability and easy to popularize and use.

5 Claims, 5 Drawing Sheets

(51) Int. Cl.
*F21V 21/30* (2006.01)
*F21W 131/308* (2006.01)
*F21V 29/67* (2015.01)
*F21Y 115/10* (2016.01)
*F21Y 113/13* (2016.01)

(56) References Cited

U.S. PATENT DOCUMENTS

| | | | | |
|---|---|---|---|---|
| 2008/0316732 A1* | 12/2008 | Blake | ............ | A01K 63/06 |
| | | | | 362/101 |
| 2010/0276410 A1* | 11/2010 | Hudson | ............ | A01K 63/06 |
| | | | | 219/220 |
| 2011/0253056 A1* | 10/2011 | Fredricks | ............ | A01K 63/06 |
| | | | | 119/247 |
| 2013/0153938 A1* | 6/2013 | Grajcar | ............ | H01L 33/647 |
| | | | | 257/88 |
| 2013/0157394 A1* | 6/2013 | Grajcar | ............ | F21K 9/90 |
| | | | | 438/27 |

* cited by examiner

CIRCULAR AQUARIUM LAMP

CROSS-REFERENCE TO RELATED APPLICATIONS

This application claims priority to Chinese Patent Application No. 201620294211.5 with a filing date of Apr. 11, 2016. The content of the aforementioned application, including any intervening amendments thereto, is incorporated herein by reference.

TECHNICAL FIELD

The invention relates to the technical field of aquarium lamp equipment which is specifically embodied as a circular aquarium lamp.

BACKGROUND OF THE INVENTION

The existing aquarium lighting is composed of traditional halogen lamp or tube that is energy consuming, especially halogen lamp. Besides, these lamps are usually much bigger and thicker when they are made of halogen bulb or tube. It makes the lamp look much bigger than the fish tank especially when the size of the fish tank is small. Esthetically speaking, it leaves people with a gloomy feeling; therefore it reduces the effect of appreciation. Although these tubes also have monochromatic light tube such as red, green, blue and yellow etc., yet it is difficult to include them in one lamp. Meanwhile, traditional aquarium lighting possesses the feature of dull color, high energy-consumption, large size, single function, diffusing beams, low-density and unnatural water shadow. On the other hand, traditional lamps use the 220 alternating current as the power source, and while most of these lamps are not waterproof, it poses a security liability when it is placed close to the water tank.

Recently, some new LED lamps have overcome the shortcomings of traditional lamps to some extent, but most of them are not equipped with the function of intelligent light-control and mobile wireless control. It is still difficult to adjust the lamp's brightness and color, switch automatically or intelligently the luminance and simulate the natural light and operate conveniently. Furthermore, the lighting power is generally not high enough, so is t he brightness.

SUMMARY OF THE INVENTION

The current technology is unable to meet the needs of the hobbyists. In order to solve the above mentioned problems, this invention has brought forth a circular aquarium lamp that contains six colors such as white, red, yellow, blue, green and purple, and that it is able to adjust the brightness of the LED lights singly or simultaneously. This lighting installation uses the white light and blue light as the main light source, wherein the white light is suitable for most lighting requirements. With the help of the additional blue lights, it may simulate sea color which is suitable to marine fishes and plants. The green and purple light are acting as the auxiliary lighting for special fishes and corals, whereas the red and yellow light are the auxiliary lighting for other fishes and plants.

To achieve the above-mentioned purpose, this invention has now provided the following technical proposal: a circular aquarium lamp that comprises of a lamp body and a lamp bracket, wherein the bracket is connected with the body through a universal ball head. The body includes an upper and lower shell, an LED lamp panel and a heat-dissipating aluminum. The upper and lower shells are connected by a screw. The LED lamp panel and heat-dissipating aluminum are installed separately in a cavity that is formed between the upper and lower shell. The LED lamp panel is located under the heat-dissipating aluminum with a fan on top. A first rubber ring is set in between the LED lamp panel and a water-proof cover, whereas a second rubber ring is set in between the cover and a glass sheet. A control board is contained inside a circuit board shell which is installed in the lower shell. A third rubber ring is set in between the upper shell and a circuit board shell. A bracket diagonal rod is connected to one side of the heat-dissipating aluminum by a supporting plate. A light guiding optical fiber is implanted inside the lower shell. Under the LED lamp panel, there set a bottom cover under which a bottom cover without lens is installed. The lamp body in description also has an adapter. An intermediate plate is set in between the upper shell and lower shell. The lamp bracket includes a positioning plate, a positioning bar, a supporting plate, a lower inclined plate, an upper inclined plate, a supporting board, a universal ball head and a plate for universal ball head. The bracket diagonal rod is connected to one side of the universal ball head through a threaded rod. The universal ball head forms a 45° degree angle with the lamp body. The plate for universal ball head and the supporting board are installed together onto the other side of t he universal ball head. The supporting board is fixedly connected to the upper inclined plate through screws, the upper inclined plate is fixedly connected to the lower inclined plate by screws; the lower inclined plate is fixedly connected to the supporting plate by screws; the supporting plate is fixedly connected to the positioning plate by screws; the positioning bar is placed inside the positioning plate and t he positioning bar is fixedly connected to the positioning plate by screws.

Firstly, the LED lamp panel is fitted with an integrated lamp beads.

Secondly, the integrated lamp beads are made up of LED red chip, LED yellow chips LED green chip, LED blue chip, LED purple chip and LED white chip, and the control board is electrically connected with LED red chip, LED yellow chip, LED green chip, LED blue chip, LED purple chip and LED white chip separately.

Thirdly, the control board is equipped with a wireless communication device fitted with a WIFI controller and mobile APP.

Additionally, the WIFI controller has an USB power supply portal.

Compared with current technology, the advantages of this invention are that the circular aquarium lamp, which possesses six colors such as white, red, yellow, blue, green and purple, is able to adjust the brightness of various LED lights singly or simultaneously. The lighting system has adopted white light and blue light as the main light source, wherein the white light is fit for most lighting requirements. In addition, the blue light may simulate sea light that fits the marine fishes and plants. The green light and purple light are the auxiliary lighting for special fishes and corals, whereas the red light and yellow light have the same function for other fishes and plants. The lamp which is convenient to use may be set in advance to switch its brightness automatically through the control chip of the PCB control panel. Moreover, the lamp is not only able to simulate various lighting effects such as sunrise and sunset, day and night, cloudy weather and thunder and cloud colors etc. but to adjust the frequency of lightning and flowing clouds. The lamp is of strong practicability. The radiator adopts strong convective heat-dissipating design, thereby enhancing greatly the cooling effect. The fan will be turned on automatically to adjust the temperature when it is relatively high, improving the heat-dissipating performance. The lamp body control chip will cut off the power automatically when the temperature exceeds the preset temperature, and it will resume power after the temperature returns back to normal, doubling the security level for the lamp. Set on the exterior of the lamp, there is a blue pilot aperture which is able to simulate the moonlight reflection effect that makes the lamp body more beautiful. Connected by a universal ball head, the angle of the lamp body and bracket can be regulated within a certain degree, making it more convenient. The lamp body and bracket are contacted directly by a threaded rod on one side of the universal ball head, and the radian of the supporting board and lamp body are in close proximity, creating the effect of dangling, thus making the lamp more attractive. Compared with traditional tubes and halogen lamps, there are more installation methods available for the lamp, so it can be installed according to different requirements in proper places. With the wireless device and WIFI controller, it may realize the function of adjusting the light via mobile APP, consequently it is more flexible to use and control. In contrast to traditional lamp lights which produce low-density and unnatural water shadows, this invention adopts the latest fish tanks' LED lighting device that has a high-power integrated LED light source which simulates and produces natural sun lights, thus it makes a perfect replacement for traditional halogen tungsten lamps and metal halides. Because of the thin and light constructer and attractive appearance, the lamp is of strong practicability and easy to popularize and use.

In the figure: 1-Lamp Body. 2-Lamp Bracket. 3-Bracket Diagonal Rod. 4-Upper Shell, 5-Lower Shell. 6-LED Lamp Panel. 7-Heat-dissipating Aluminum. 8-Fan. 9-Waterproof Cover. 10-First Rubber Ring. 11-Glass Sheet. 12-Second Rubber Ring. 13-Circuit Board Shell, 4-Control. Board. 15-Third Rubber Ring. 16-Bracket Plate, 17-Light Guiding Optical Fiber. 18-Bottom Cover. 19-Bottom Cover without Lens, 20-Adapter. 21-WIFI Controller. 22-USB Power Supply Portal. 23-Positioning Plate. 24-Positioning Bar. 25-Supporting Plate. 26-Lower Inclined Plate. 27-Upper Inclined Plate. 28-Supporting Board. 29-Universal Ball Head. 30-Plate for Universal Ball Head. 31-Integrated Lamp Beads. 32-Intermediate Plate.

Specific Embodiments

Combined with the drawings of the invention, the following content shall be described in clear details about the technical embodiments of the model. Apparently, the description relates to only a part of the embodiments instead of all. On the condition that the general technicians in this field have not yet contributed any creative labor, all other embodiments obtained by them in this field shall fall within the scope of protection of this invention.

Figure 1:
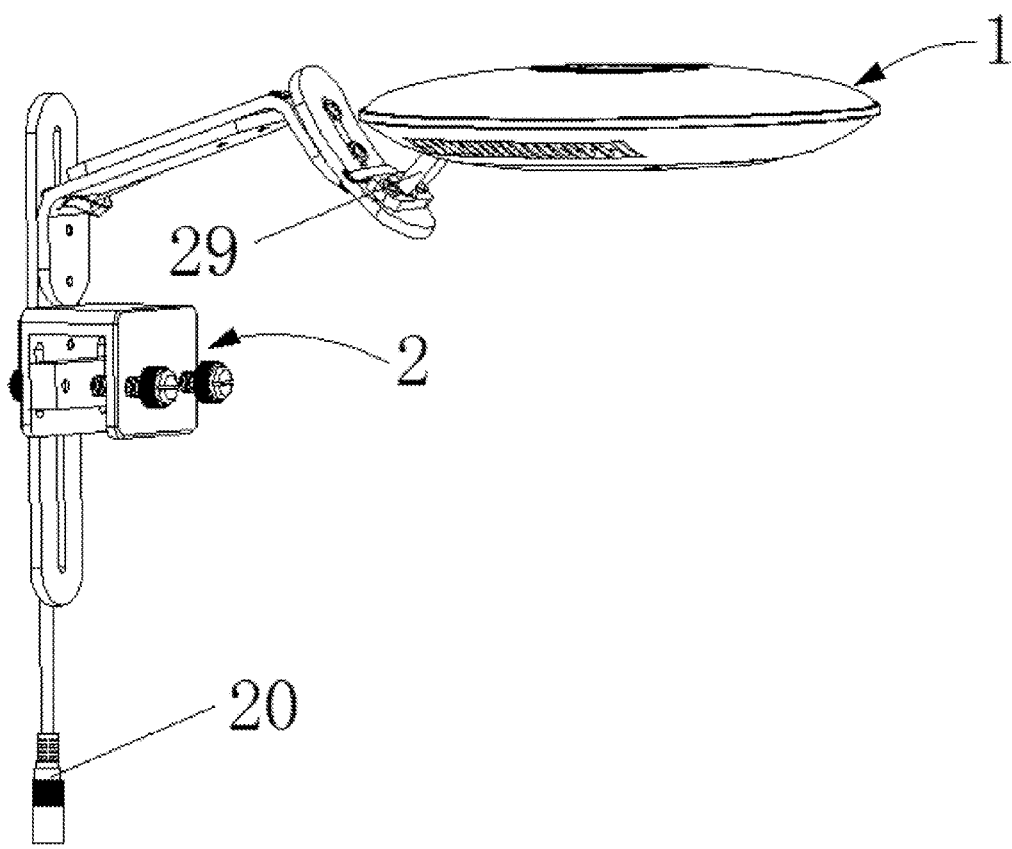
FIG. 1 is a schematic diagram illustrating a structure of the invention after assembly.
Figure 2:
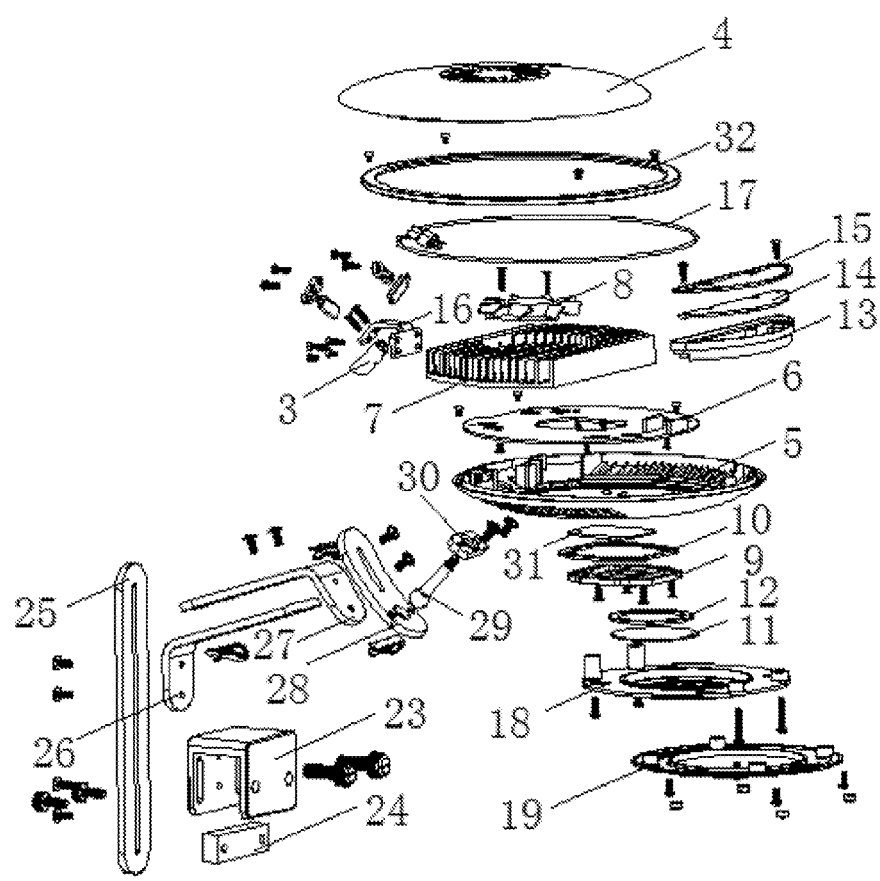
FIG. 2 is a layout of the invention.
Figure 3:
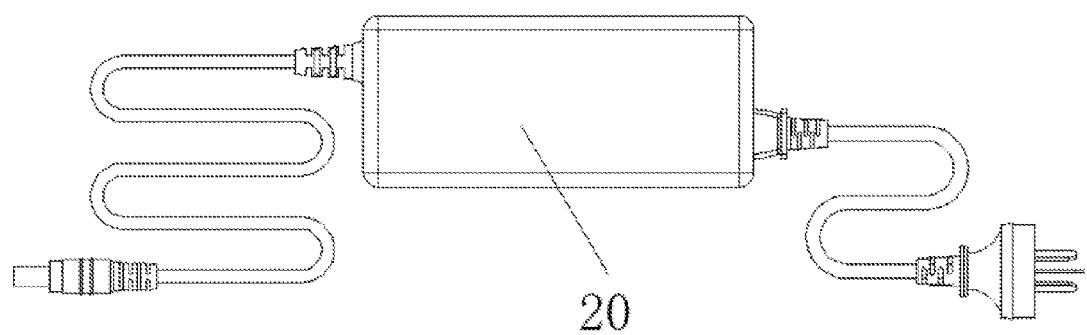
FIG. 3 is a schematic diagram illustrating a structure of the, adapter of the invention.
Figure 4:
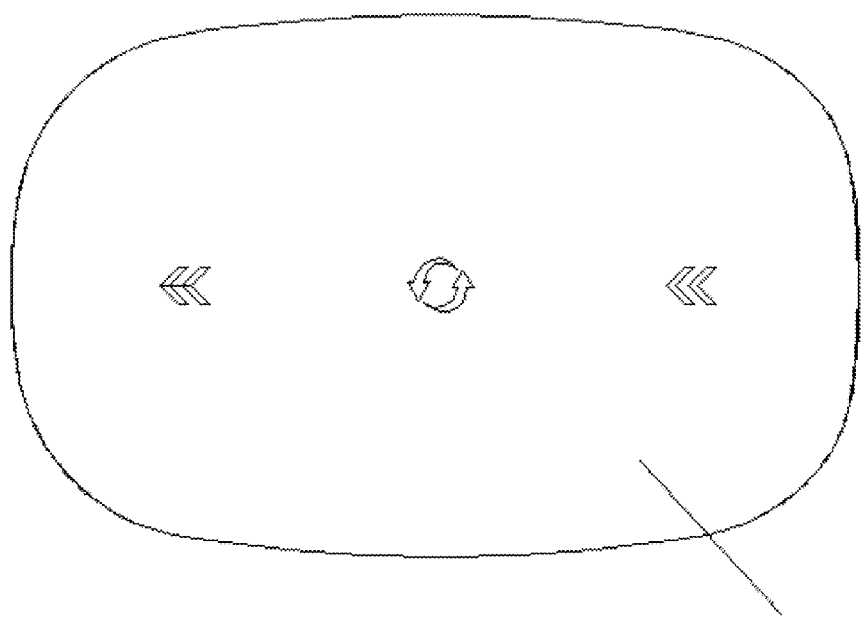
FIG. 4 is a schematic diagram illustrating the structure of WIFI controller of the invention.
Figure 5:
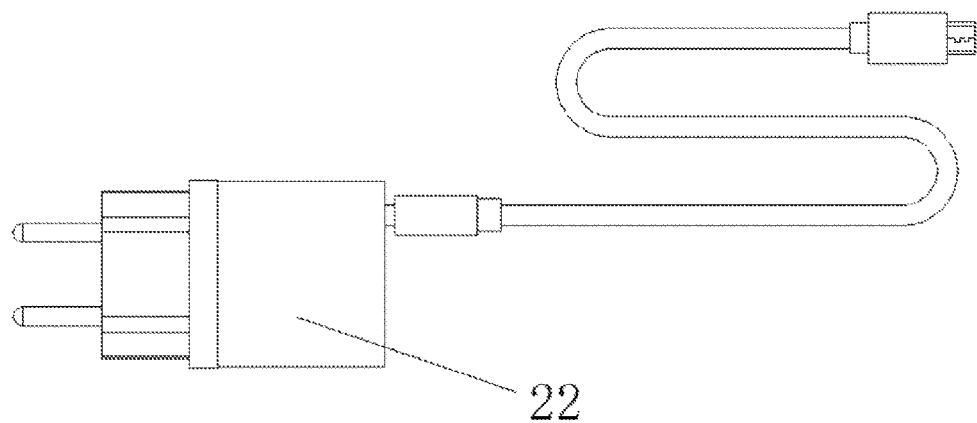
FIG. 5 is a schematic diagram illustrating the structure of USB power source of the invention.

Please refer to FIGS. 1-5 where the invention provides an embodiment: The circular aquarium lamp in description comprises of a lamp body (1) and a lamp bracket (2), the characteristics of which are shown in that the lamp bracket (2) and lamp body (1) are connected through a universal ball head (29). The lamp body (1) has an upper shell (4) and a lower shell (5), a LED lamp panel (6) and a heat-dissipating aluminum (7). The upper shell (4) is connected to the lower shell (5) by a screw. The LED lamp panel (6) and heat-dissipating aluminum (7) are installed separate y in a cavity that is formed between the upper shell (4) and lower shell (5). The LED lamp panel (6) is located under the heat-dissipating aluminum (7) which has a fan (8) on top. A first rubber ring (10) is set in between the LED lamp panel (6) and a water-proof cover (9), whereas a second rubber ring (12) is set in between the cover (9) and a glass sheet (11). A control board (14) is contained inside a circuit board shell (13) which is installed in the lower shell (5). A third rubber ring (15) is set in between the upper shell (4) and circuit board shell. A bracket diagonal rod (3) is connected to one side of the heat-dissipating aluminum (7) by a supporting plate (16). A light guiding optical fiber (17) is implanted inside the lower shell (5). Under the LED lamp panel (6), there set a bottom cover (18) under which a bottom cover without lens (19) is installed. The lamp in description (1) also has an adapter (20). An intermediate plate (32) is set in between the upper shell (4) and lower shell (5). The lamp bracket (2) includes a positioning plate (23), a positioning bar (24), a supporting plate (25), a lower inclined plate (26), an upper inclined plate (27), a supporting board (28), a universal ball head (29) and a plate for universal ball head (30). The bracket diagonal rod (3) is connected to one side of the universal ball head (29) through a threaded rod The universal ball head (29) forms a 45° degree angle with the lamp body (1). The plate for universal ball head (30) and supporting board (28) are installed together onto the other side of the universal ball head (29). The supporting board (28) can be connected to the upper inclined plate (27) through a screw. A screw connects the upper inclined plate (27) and the lower inclined plate (26), which is connected by a screw to the supporting plate (25). It is connected to the positioning plate (23) by a screw. The positioning bar (24) is placed inside the positioning plate (23) by screws. The LED lamp panel (6) in description is fitted with integrated lamp beads (31). The integrated lamp beads (31) contains LED red chip, LED yellow chip, LED green chip, LED blue chip, LED purple chip and LED white chip, and that the control board (14) is electrically connected to the LED red chip, LED yellow chip, LED green chip, LED blue chip, LED purple chip and LED white chip separately. The control board (14) is equipped with a wireless communication device fitted with a WIFI controller (21) and mobile APP. The WIFI controller (21) has an USB power supply portal (22).

When using this circular aquarium lamp of the invention, connect first the lamp body (1) and the lamp bracket (2) by using the universal ball head (29). To make it more convenient to use, regulate the angle between the lamp body (1) and the lamp bracket (2) as needed within the range allowed. The lamp body (1) and lamp bracket (2) are contacted directly by a threaded rod on one side of the universal ball head (29), and the radian of the supporting board (28) and lamp body (1) are in close proximity, creating the effect of dangling thus making the lamp body (1) more attractive. The control board (14) will cut off the power for the lamp body (1) automatically when the temperature exceeds the preset temperature, and it will resume power after the temperature returns back to normal, doubling the security level for the lamp and making it easier to handle.

As for the technicians of this field, while the invention has been shown and described with reference to a certain preferred embodiment thereof, various changes in form and details may be made therein without departing from the spirit or essential features of the invention as defined by the appended claims. Consequently, regardless of any standpoints, all embodiments should be viewed as demonstrative and non-restrictive. The scope of the invention is as required by the accompanying claims rather than limited by the above description. Therefore, the invention aims to include all changes within the scope and meaning of the equivalent elements of t he rights requirements. Any drawings from the rights requirements should not be regarded as a limitation it involves.

I claim:

1. A circular aquarium lamp comprises of a lamp body (1) and lamp bracket (2), the characteristics of which are shown in that the lamp bracket (2) and lamp body (1) are connected through a universal ball head (29); the lamp body (1) has an upper shell (4) and a lower shell (5), an LED lamp panel (6) and a heat-dissipating aluminum (7); the upper shell (4) is connected to the lower shell (5) by a screw; the LED lamp panel (6) and heat-dissipating aluminum (7) are installed separately in a cavity that is formed between the upper shell (4) and lower shell (5); the LED lamp panel (6) is located under the heat-dissipating aluminum (7) which has a fan (8) on top; a first rubber ring (10) is set in between the LED lamp panel (6) and a water-proof cover (9), whereas a second rubber ring (12) is set in between the cover (9) and a glass sheet (11); a control board (14) is contained inside a circuit board shell (13) which is installed in the lower shell (5); a third rubber ring (15) is set in between the upper shell (4) and circuit board shell; a bracket diagonal rod (3) is connected to one side of the heat-dissipating aluminum (7) by a supporting plate (25); a light guiding optical fiber (17) is implanted inside the lower shell (5); under the LED lamp panel (6), there set a bottom cover (8) under which a bottom cover without lens (19) is installed; the lamp body (1) has an electrical adapter (20); an intermediate plate (32) is set in between the upper shell (4) and lower shell (5);

the lamp bracket (2) includes a positioning plate (3), a positioning bar (24), the supporting plate (25), a lower inclined plate (26), an upper inclined plate (27), a supporting board (28), the universal ball head (29) and a plate for universal ball head (30); the bracket diagonal rod (3) is connected to one side of the universal ball head (29) through a threaded rod; wherein the universal ball head (29) forms a 45° degree angle with the lamp body (1); the plate for universal ball head (30) and supporting board (28) are installed together onto the other side of the universal ball head (29); the supporting board (28) is fixedly connected to the upper inclined plate (27) through screws, the upper inclined plate (27) is fixedly connected to the lower inclined plate (26) by screws; the lower inclined plate (26) is fixedly connected to the supporting plate (25) by screws; the supporting plate (25) is fixedly connected to the positioning plate (23) by screws; the positioning bar (24) is p laced inside the positioning p late (23)and the positioning bar (24) is fixedly connected to the positioning plate (23) by screws.

2. The circular aquarium lamp according to claim 1 is characterized by that the LED lamp panel (6) is fitted with integrated lamp beads (31).

3. The circular aquarium lamp according to claim 2 is characterized by that the integrated lamp beads (31) contains LED red chip, LED yellow chip, LED green chip, LED blue chip, LED, purple chip and LED white chip, and that the control board (14) is electrically connected to the LED red chip, LED yellow chip, LED green chip, LED blue chip, LED purple chip and LED white chip separately.

4. The circular aquarium lamp according to claim 1 is characterized by that the control board (14) is equipped with a wireless communication device fitted with a WIFI controller (21) and mobile APP.

5. The circular aquarium lamp according to claim 4 is characterized by that the WIFI controller (21) has an USB power supply portal (22).

* * * * *